(12) United States Patent
Park et al.

(10) Patent No.: US 8,755,639 B2
(45) Date of Patent: Jun. 17, 2014

(54) IMAGE SCALING METHOD AND APPARATUS WITH ENHANCEMENT OF IMAGE QUALITY

(75) Inventors: Jong-hyun Park, Seoul (KR); Jae-hun Lee, Yongin-si (KR); Moon-gi Kang, Seoul (KR); Ji-yong Kwon, Seoul (KR); Du-sic Yoo, Gochang-gun (KR); Joon-young Chang, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 621 days.

(21) Appl. No.: 13/018,961

(22) Filed: Feb. 1, 2011

(65) Prior Publication Data

US 2011/0188772 A1 Aug. 4, 2011

(30) Foreign Application Priority Data

Feb. 1, 2010 (KR) ........................ 10-2010-0009163

(51) Int. Cl.
*G06K 9/32* (2006.01)
(52) U.S. Cl.
USPC .......................................................... 382/300
(58) Field of Classification Search
USPC .......................................... 382/293, 298–300
See application file for complete search history.

(56) References Cited

U.S. PATENT DOCUMENTS 6,018,597 A * 1/2000 Maltsev et al. ............... 382/260
2005/0249437 A1* 11/2005 Wang et al. ................... 382/300

* cited by examiner

*Primary Examiner* — Wesley Tucker
(74) *Attorney, Agent, or Firm* — Sughrue Mion, PLLC

(57) ABSTRACT

An image scaling apparatus and method, with enhancement of image quality. The method includes generating a plurality of intermediate pixels positioned near a plurality of resultant pixels to be generated to scale an input image using pixels of the input image; determining the image characteristics of the plurality of resultant pixels using a predetermined region of the input image or the plurality of intermediate pixels within the predetermined region; determining a filter for generating the plurality of resultant pixels based on the image characteristics with respect to the resultant pixels, and generating the plurality of resultant pixels through filtering of the plurality of intermediate pixels using the determined filter. The apparatus includes an intermediate pixel generation unit which generates a plurality of intermediate pixels. A filter determination unit determines a filter for generating the plurality of resultant pixels. A resultant pixel generation unit generates the plurality of resultant pixels.

19 Claims, 4 Drawing Sheets

IMAGE SCALING METHOD AND APPARATUS WITH ENHANCEMENT OF IMAGE QUALITY

CROSS-REFERENCE TO RELATED PATENT APPLICATION

This application claims priority from Korean Patent Application No. 10-2010-0009163, filed on Feb. 1, 2010, in the Korean Intellectual Property Office, the disclosure of which is incorporated herein in its entirety by reference.

BACKGROUND

1. Field

The exemplary embodiments relate to image scaling and an enhancement of image quality.

2. Description of the Related Art

A method of increasing the amount of information relating to spatial region is widely used by additionally generating a pixel using interpolation or super-resolution, in order to perform image scaling.

Conventional interpolation generates a pixel value of a scaled image through 2-dimensional filtering or continuous 1-dimensional filtering in a vertical direction and in a horizontal direction, by using a filter designed to realize bilinear interpolation, cubic interpolation, nearest neighbor interpolation (NNI), etc.

SUMMARY

The exemplary embodiments provide image scaling and an enhancement of image quality through image resampling.

According to an aspect of the exemplary embodiments, there is provided an image scaling method with an enhancement of image quality including: generating a plurality of intermediate pixels positioned near a plurality of resultant pixels that are to be generated to scale an input image by using pixels of the input image; determining the image characteristics of the plurality of resultant pixels using a predetermined region of the input image or the plurality of intermediate pixels within the predetermined region; determining a filter for generating the plurality of resultant pixels based on the image characteristics with respect to the resultant pixels, and generating the plurality of resultant pixels through filtering of the plurality of intermediate pixels using the determined filter.

According to another aspect of the exemplary embodiments, there is provided an image scaling apparatus that provides an enhancement of image quality including: an intermediate pixel generation unit which generates a plurality of intermediate pixels positioned near a plurality of resultant pixels that are to be generated to scale an input image by using pixels of the input image; a filter determination unit which determines the image characteristics of the plurality of resultant pixels using a predetermined region of the input image or the plurality of intermediate pixels within the predetermined region and determines a filter which generates the plurality of resultant pixels based on the image characteristics with respect to the resultant pixels; and a resultant pixel generation unit which generates the plurality of resultant pixels through filtering of the plurality of intermediate pixels using the determined filter.

The generating of the plurality of intermediate pixels may include variably determining the number, positions, and distribution of the plurality of intermediate pixels.

The generating of the plurality of intermediate pixels may include determining the plurality of intermediate pixels to be positioned based on the positions of the plurality of resultant pixels, in sub-pixel units.

The generating of the plurality of intermediate pixels may include determining a filter which generates the plurality of intermediate pixels, and is applied to pixels of the predetermined region of the input image in the same manner as that applied to all pixels of the input image, or variably determining the filter based on the image characteristics of the predetermined region of the input image, in order to generate the plurality of intermediate pixels.

The generating of the plurality of intermediate pixels may include additionally generating a plurality of intermediate pixels at new positions from among a plurality of intermediate pixels used for a next resultant pixel that is to be generated after a current resultant pixel, compared to a plurality of intermediate pixels of a current resultant pixel.

The determining of the filter may include determining at least one of a direction, shape, length and coefficient of the filter based on the image characteristics of the predetermined region of the input image or the intermediate pixels within the predetermined region.

The determining of the filter may include determining a filter which maintains existence and directions of edge or detail components of the predetermined region of the input image or the plurality of intermediate pixels within the predetermined region. The determining of the filter may include determining the filter to have an asymmetrical coefficient weight for each region identified by the direction of edge or detail, in order to prevent a shoot artifact from being generated during maintaining the edge or detail components. The determining of the filter may include determining the filter to have a relatively high coefficient weight according to the direction of edge or detail in order to prevent a jagging artifact of the edge or detail components from being generated.

The generating of the plurality of intermediate pixels may include using a plurality of input images.

The apparatus may further include a buffer memory which stores the plurality of intermediate pixels generated by the intermediate pixel generation unit, wherein the intermediate pixel generation unit additionally generates a plurality of intermediate pixels at new positions from among a plurality of intermediate pixels used for a next resultant pixel that is to be generated after a current resultant pixel. The intermediate pixel generation unit then stores, with respect to the plurality of intermediate pixels generated for a current resultant pixel and stored in the buffer memory, the additionally generated plurality of intermediate pixels in the buffer memory.

According to another aspect of the exemplary embodiments, there is provided a computer readable recording medium having recorded thereon a program for executing the image scaling method with an enhancement of image quality.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, the present invention will be described in detail by explaining the exemplary embodiments, with reference to the attached drawings.

Figure 1:
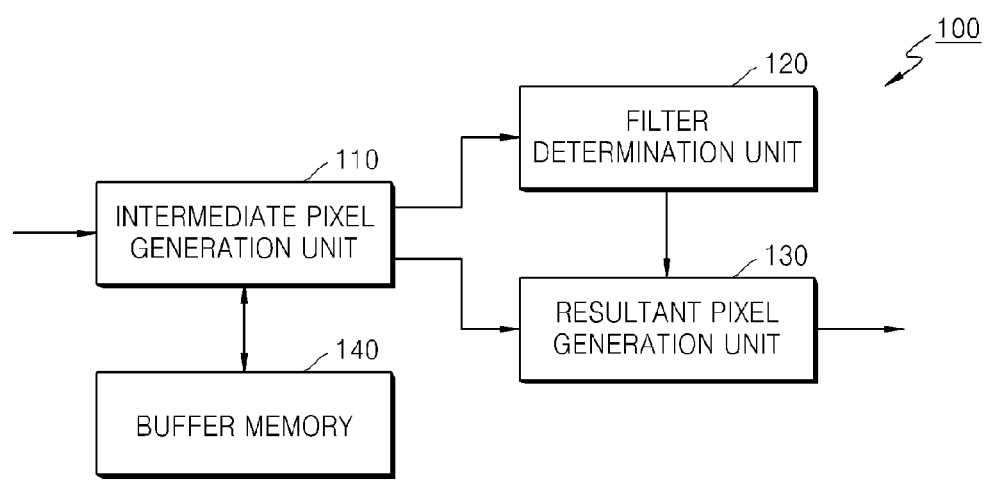
FIG. 1 is a block diagram of an image scaling apparatus accompanied with an enhancement of image quality according to an exemplary embodiment.

FIG. 1 is a block diagram of an image scaling apparatus 100 accompanied with enhancement of image quality according to an exemplary embodiment.

Referring to FIG. 1, image scaling apparatus 100 provides enhancement of image quality, and includes an intermediate pixel generation unit 110, a filter determination unit 120, a resultant pixel generation unit 130 and a buffer memory 140.

Intermediate pixel generation unit 110 generates intermediate pixels using pixels of an input image. The intermediate pixels may be generated through interpolation filtering performed on the pixels of the input image. A filter used to generate the intermediate pixels may include a variety of interpolation filters, such as a bilinear filter using a pixel value of the input image, a cubic filter, a windowed sync filter, a Lanczos filter, etc.

Intermediate pixel generation unit 110 may generate the intermediate pixels at a position of a current resultant pixel. Intermediate pixel generation unit 110 may variably determine the number, positions, and distribution forms of the intermediate pixels. For example, the number, positions, and distribution forms of the intermediate pixels are variably determined in consideration of a magnification or a noise reduction of the input image, or an enhancement of image quality, such as a reduction of a jagging artifact in an edge region.

Intermediate pixel generation unit 110 may determine the intermediate pixels to be positioned near resultant pixels that are to be output as a result of magnifying the input image. For example, intermediate pixel generation unit 110 may determine the intermediate pixels to be positioned based on the positions of the resultant pixels in sub-pixel units.

Intermediate pixel generation unit 110 may design the interpolation filter used to generate the intermediate pixels in the same manner with respect to all pixels of the input image. Intermediate pixel generation unit 110 may variably determine the characteristics of the interpolation filter based on the image characteristics of a predetermined region of the input image.

Intermediate pixel generation unit 110 may compare current intermediate pixels used for current resultant pixels, generate additionally necessary intermediate pixels, and repeatedly use overlapping pixels between the current intermediate pixels and intermediate pixels for next resultant pixels, without re-establishing the overlapping pixels, in order to generate the intermediate pixels used for the next resultant pixels that are to be generated after the current resultant pixels.

Filter determination unit 120 determines the image characteristics of the resultant pixel using either a predetermined region of the input image or the intermediate pixels within a predetermined region generated by the intermediate pixel generation unit 110. Filter determination unit 120 determines a resultant output filter for applying intermediate pixels and outputting the resultant pixel based on the image characteristics of the resultant pixel.

Filter determination unit 120 may determine at least one of a direction, shape, length, and coefficient of the resultant output filter based on the image characteristics of the predetermined region of the input image or the intermediate pixels within the predetermined region generated by intermediate pixel generation unit 110.

Filter determination unit 120 may determine the filter characteristics such as the direction, shape, length, and coefficient of the resultant output filter in order to maintain existence and directions of edge or detail components of the predetermined region of the input image or the intermediate pixels within the predetermined region generated by intermediate pixel generation unit 110. Filter determination unit 120 may adjust the filter characteristics of the resultant output filter by analyzing the image characteristics using input image pixels or intermediate image pixels positioned in a filtering region to which the resultant output filters are to be applied.

Alternatively, filter determination unit 120 may determine the filter characteristics of the resultant output filter so as to have an asymmetrical weight for each region identified by a direction of an edge or a direction of a detail. A filter to which an asymmetrical coefficient weight is allocated in view of the direction of the edge or the direction of the detail may prevent a shoot artifact from being generated during filtering performed to maintain an edge or detail component.

Alternatively, filter determination unit 120 may establish a relatively high weight with respect to the coefficient of the resultant output filter according to the direction of the edge or the direction of the detail. A filter to which the relatively high weight is allocated according to the direction of the edge or the direction of the detail may prevent a jagging artifact of the edge or detail component.

Resultant pixel generation unit 130 may perform filtering by using a filter determined by filter determination unit 120 with respect to the intermediate pixels within the predetermined region generated by intermediate pixel generation unit 110, and generate and output resultant pixels of a magnified image.

Image scaling apparatus 100 accompanied with enhancement of image quality of the exemplary embodiment further includes a buffer memory 140 for storing the generated intermediate pixels. Intermediate pixel generation unit 110 may additionally generate intermediate pixels in new positions for the current resultant pixels from the next intermediate pixels used for the next resultant pixels and store generated intermediate pixels in the buffer memory. That is, intermediate pixels that do not overlap the current intermediate pixels may be updated as the next intermediate pixels.

A capacity of the buffer memory 140 may be determined to store intermediate pixels generated in a horizontal direction with respect to one or more lines of the input image in terms of processing performed in a horizontal direction of the input image.

Intermediate pixel generation unit 110 may generate the intermediate pixels using a plurality of input images. Intermediate pixel generation unit 110 may generate the intermediate pixels for the resultant pixels of the magnified image by using a plurality of image frames (pictures and slices) among input image sequences.

For example, intermediate pixel generation unit 110 may generate an intermediate pixel for each reference region of other image frames corresponding to a filtering region for generating current intermediate pixels of a current image frame. In this case, resultant pixel generation unit 130 may generate the current resultant pixels using the current intermediate pixels of the current image frame and intermediate pixels of other image frames.

As another example, intermediate pixel generation unit 110 may generate the current intermediate pixels of the current image frame using image information of the filtering region for generating current intermediate pixels and reference regions of other image frames. In case of image scaling through general interpolation filtering, a filter for smoothing a magnified image may output a soft and natural magnified image having no overshoot or undershoot artifact, while reducing sharpness of the magnified image, and thus the magnified image is excessively smoothed. A filter for sharpening the magnified image enhances sharpness of the magnified image, while generating the overshoot or undershoot artifact. Further, a filter which does not consider an edge of the input image excessively smoothes the edge of the input image. A filter which considers the edge of the input image maintains the edge of a magnified image through interpolation filtering and prevents the jagging artifact, while emphasizing unclear detail information in a flat region and thus an original image may be damaged.

Meanwhile, image scaling apparatus 100, which enhances image quality, automatically changes the shape of a filter according to the characteristics of each region of the input image. This results in softly interpolating an image in a flat region while maintaining an edge of the image in an edge region. Image scaling apparatus 100, which enhances the image quality, may select the resultant output filter so as to adaptively filter both the flat region and the edge region of the input image. Thus, resultant output filtering is performed based on the image characteristics by using the intermediate pixels generated through interpolation filtering performed by the intermediate pixel generation unit 110. This reconfigures scaled image pixels through interpolation, and simultaneously enhances the quality of an image scaled according to the image characteristics.

Since intermediate pixel generation unit 110 may generate intermediate pixels according to the image characteristics based on information of temporal and spatial neighborhoods of a current region of a current input image using a plurality of input images, pixel generation unit 130 may generate a current resultant pixel according to the image characteristics, based on the information of the temporal and spatial neighborhood of the current region of the current input image. That is, image scaling apparatus 100, which enhances image quality of the exemplary embodiment, may obtain a scaled image with high quality enhancement, according to the temporal and spatial image characteristics of each region.

The conventional technologies for enhancing quality of a scaled image through a filtering based post-processing module need, a predetermination of line memories for each post-processing module. Meanwhile, when image scaling apparatus 100 which enhances image quality is realized as an application specific integrated circuit (ASIC), a line memory for each post-processing module can be replaced with either a buffer memory or a register having a minimum capacity for storing intermediate pixels, thereby reducing the size of an ASIC chip.

Figure 2:
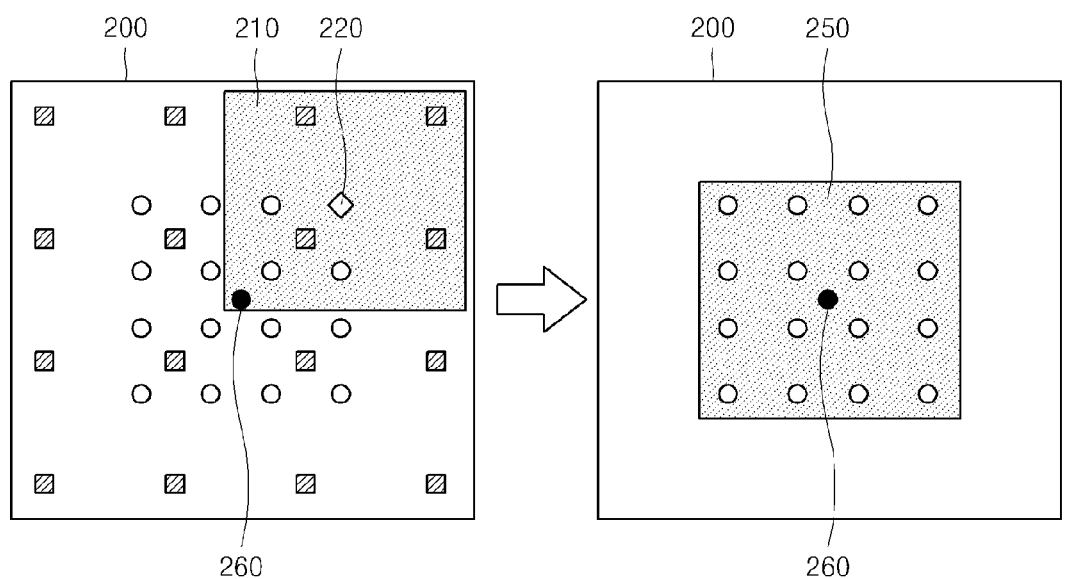
FIG. 2 illustrates intermediate pixels and a resultant pixel according to an exemplary embodiment.

FIG. 2 illustrates intermediate pixels and a resultant pixel according to an exemplary embodiment.

Referring to FIG. 2, rectangular pixels of an input image 200 are original pixels, and bright circular pixels are intermediate pixels. A current intermediate pixel 220 may be determined by performing interpolation filtering on some pixels of input image 200 included in a filtering region 210 within sub-pixel units. Intermediate pixel generation unit 110 may move the filtering region 210 for generating the intermediate pixels in sub-pixel units, and determine the intermediate pixels through interpolation filtering performed on filtering region 210.

The intermediate pixels generated through interpolation filtering in sub-pixel units may correspond to pixels reconfigured in sub-pixel units of input image 200. In order to increase the operational speed of intermediate pixel generation unit 110, the intermediate pixels may be generated by using an interpolation filter having the same characteristics for all image pixels. Alternatively, the filter characteristics for interpolation filtering may be variably determined according to the image characteristics of filtering region 210. For example, in order to reduce a shoot artifact of an edge region, an interpolation filter having many taps may be used in a flat region, whereas an interpolation filter having less taps may be used in a strong edge region.

Pixel generation unit 130 may determine a pixel 260 by performing filtering on the intermediate pixels of a current filtering region 250 using a resultant output filter. Filter determination unit 120 may determine the filter characteristics of the resultant output filter according to the characteristics of the intermediate pixels of current filtering region 250 and pixels of input image 200, or current filtering region 250.

Figure 3:
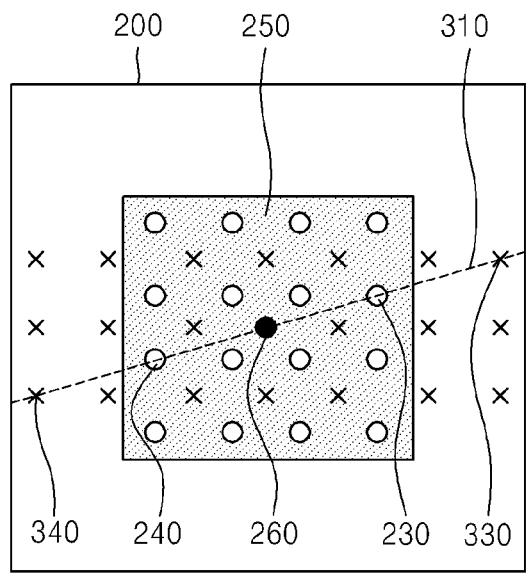
FIG. 3 illustrates a position comparison between a resultant pixel and intermediate pixels according to an exemplary embodiment.

FIG. 3 illustrates a position comparison between a resultant pixel and intermediate pixels according to an embodiment of the present invention.

Referring to FIG. 3, the intermediate pixel generation unit 110 may determine intermediate pixels to be positioned obased on positions of resultant pixels. Bright circular pixels are the intermediate pixels. X-marked pixels are the resultant pixels. Intermediate pixel generation unit 110 determines the positions of the intermediate pixels to be positioned by 0.5 pixel from positions of the X-marked pixels and a current resultant pixel 260.

The intermediate pixels are determined to be positioned based on the positions of the resultant pixels in sub-pixel units, and thus precise image information can be obtained, thereby efficiently obtaining image information in a relatively small region.

For example, if current filtering region 250 includes an edge 310, in order to determine a resultant output filter according to a direction of edge 310, it is necessary to analyze only the image characteristics of a region including intermediate pixels 230 and 240 that pass through edge 310. However, if the intermediate pixels exist in the X-marked pixels, it is necessary to analyze the image characteristics of a region including edge 310 using a region including X-marked pixels 330 and 340 that pass through edge 310.

Therefore, in order to analyze the image characteristics of a region for output filtering according to the direction of the edge 310, a filter application region including the intermediate pixels that are positioned by 0.5 pixel from the positions of the resultant pixels, may be used rather than a filter application region including the X-marked pixels 330 and 340.

Figure 4:
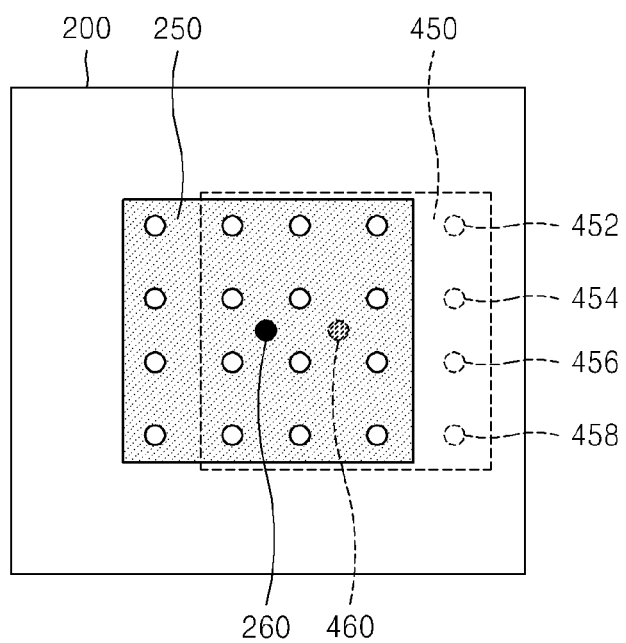
FIG. 4 is a diagram for explaining a method of updating intermediate pixels according to an exemplary embodiment.

FIG. 4 is a diagram for explaining a method of updating intermediate pixels according to an exemplary embodiment.

Referring to FIG. 4, intermediate pixel generation unit 110 generates intermediate pixels of current filtering region 250 and stores the intermediate pixels in buffer memory 140. Resultant pixel generation unit 130 may generate current resultant pixel 260 by performing output filtering using the intermediate pixels of the current filtering region 250 stored in the buffer memory 140.

In accordance with a processing sequence of the resultant pixel generation unit 130, it is necessary to perform resultant output filtering on intermediate pixels of a next filtering region 450 in order to generate a next resultant pixel 460, after generating the current resultant pixel 260.

Since the overlapping intermediate pixels of current filtering region 250 and the next filtering region 450 are previously stored in a buffer memory, the intermediate pixel generation unit 110 generates additional intermediate pixels 452, 454, 456, and 458, and stores intermediate pixels 452, 454, 456, and 458 in the buffer memory. Resultant pixel generation unit 130 may generate next resultant pixel 260 by performing resultant output filtering using the intermediate pixels of next filtering region 450, stored in the buffer memory.

In a similar manner, most of the intermediate pixels used to reconfigure current pixels of an input image may be used to reconfigure next pixels. Thus, if intermediate pixels that are added to a filtering region are newly generated and updated in a buffer memory when reconfiguration processing proceeds in pixel units, the operation for generating intermediate pixels for each pixel of the input image is greatly reduced.

Therefore, image scaling apparatus 100 which enhances image quality, uses intermediate pixels that are interpolated in the same magnification as resultant pixels, and reconfigured to positions based on positions in sub-pixel units Thus, intermediate pixel generation unit 110, additionally updates important pixels according to a necessary processing sequence. Alternatively, either a buffer memory or a register may be used instead of a line memory.

Figure 5:
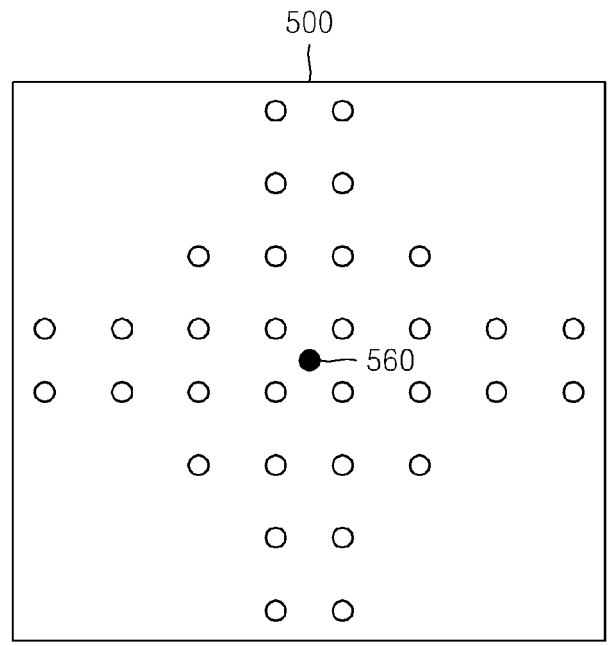
FIG. 5 illustrates positions and distribution of intermediate pixels according to an exemplary embodiment.

FIG. 5 illustrates positions and distribution of intermediate pixels according to an exemplary embodiment.

Referring to FIG. 5, the positions and distribution of the intermediate pixels generated by intermediate pixel generation unit 110 may be variably determined according to the image characteristics of filtering region 210. For example, if an edge component in a vertical direction is determined to be strong as a result of analyzing the image characteristics, since there is a high possibility that a jagging artifact is generated in the edge region, the positions and distribution of the intermediate pixels may be determined, in order to reduce the jagging artifact.

In order to consider the jagging artifact in an edge closer to the horizontal and vertical directions, intermediate pixel generation unit 110 may generate the intermediate pixels used to generate a resultant pixel 560 to be arranged in horizontal and vertical directions in view of resultant pixel 560.

Therefore, intermediate pixel generation unit 110 may generate the intermediate pixels, distributed in a variety of types of regions including: a vertically long region; a horizontally long region; a diagonally long region at a predetermined angle; a horizontally and vertically long cross shaped region; an X-shaped region long in both diagonal directions; a honeycomb shaped region, and a diamond shaped region, etc., based on the image characteristics of a corresponding region.

Figure 6:
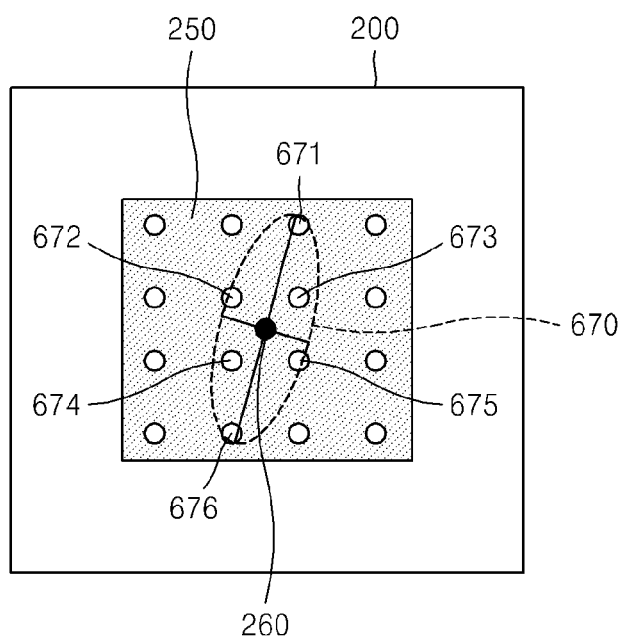
FIG. 6 illustrates a filter for generating a resultant pixel according to an exemplary embodiment.

FIG. 6 illustrates a filter for generating a resultant pixel according to an exemplary embodiment of the present invention.

Filter determination unit 120 may determine the filter characteristics, such as a direction, shape, length, and coefficient of a resultant output filter based on the image characteristics of the input image 200, or the current filtering region 250. For example, filter determination unit 120 may determine a flat region, an edge region, or a region including detail information like a texture by analyzing the image characteristics of current filtering region 250, and adaptively design the resultant output filter according to the image characteristics.

Referring to FIG. 6, if an edge component that passes through intermediate pixels 671 and 676 is detected by analyzing current filtering region 250, filter determination unit 120 may adjust a filter coefficient to establish a high weight for an edge region 670, including intermediate pixels 671 and 676 that pass through an edge, and intermediate pixels 672 through 675 around the edge. That is, the high weight is established for the filter coefficient with respect to intermediate pixels 671 through 676 included in an oval region having a major axis in an edge direction and a minor axis in perpendicular to the edge direction, thereby reducing a jagging artifact of the resultant pixel.

Filter determination unit 120 may determine the filter characteristics of the resultant output filter according to the edge region, thereby designing the resultant output filter in such a way that edge directionality and a detail component of an image can be emphasized. Alternatively, since filter determination unit 120 controls a coefficient of the resultant output filter in order to establish asymmetrical coefficient weights to both regions divided by the edge component, resultant pixel generation unit 130 may reduce a shoot artifact of the edge component through resultant output filtering with respect to the intermediate pixels and simultaneously generate a resultant pixel reconfigured for scaling an input image.

Figure 7:
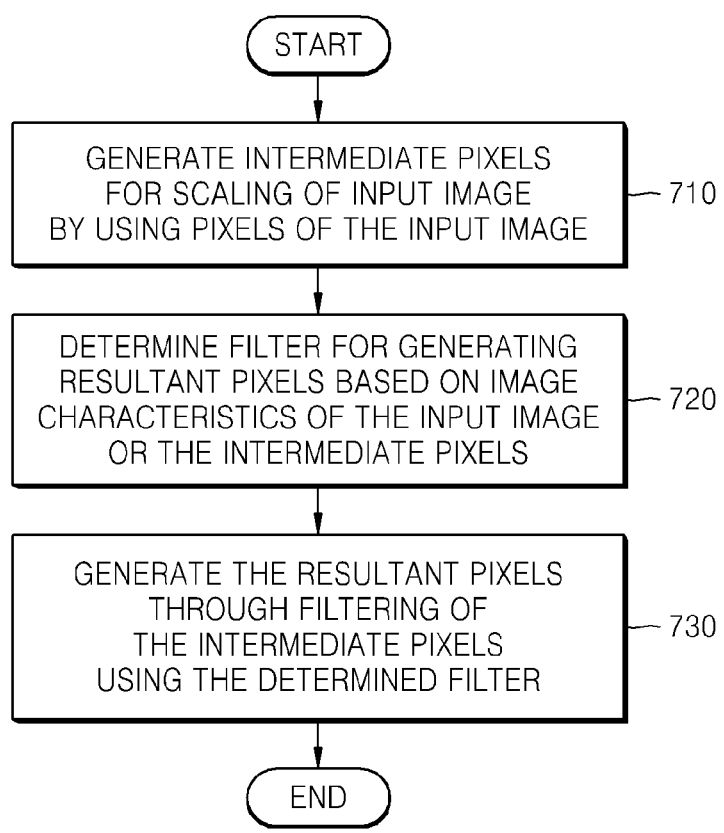
FIG. 7 is a flowchart of an image scaling apparatus method with enhancement of image quality according to an exemplary embodiment.

FIG. 7 is a flowchart of an image scaling apparatus method which enhances image quality, according to an exemplary embodiment.

Referring to FIG. 7, in operation 710, intermediate pixels positioned near resultant pixels that are to be generated in order to scale an input image are generated by using pixels of the input image. Since a plurality of intermediate pixels near the resultant pixels may be used to generate the resultant pixels, a plurality of intermediate pixels may be generated and stored in a buffer memory. A plurality of input images may be used to generate the intermediate pixels.

The intermediate pixels may be determined to be positioned based on positions of the resultant pixels in sub-pixel units, in both vertical and/or horizontal directions. Positions and distribution of the intermediate pixels may be determined in various ways according to the image characteristics. Necessary intermediate pixels may be additionally generated according to pixel reconfiguration processing, and may be updated to the buffer memory.

In operation 720, the image characteristics of the resultant pixels are determined using a predetermined region of the input image or the intermediate pixels within the predetermined region. A resultant output filter for generating the resultant pixels may be determined, based on the image characteristics of the resultant pixels. The image characteristics of the input image or the intermediate pixels within a filtering region used to generate the resultant pixels, may be analyzed. A coefficient, length, tap number, shape, etc, of the resultant output filter may be determined according to the characteristics of the image.

In operation 730, the resultant pixels are generated by performing filtering using the resultant output filter according to the filter characteristics determined in operation 720. The image scaling method of the present embodiment may perform an operation of generating the resultant pixels reconfigured to scale the input image and enhancing image quality according to characteristics of the image.

Therefore, the image scaling apparatus and method which enhances image quality of the present embodiment performs final filtering based on the image characteristics using the intermediate pixels generated through interpolation filtering; thereby reconfiguring scaled image pixels through interpolation, and simultaneously enhancing the quality of an image scaled according to the characteristics of the image.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the image scaling apparatus with enhancement of image quality can include a processor or microprocessor executing a computer program stored in a computer-readable medium, such as a local storage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image scaling method for enhancing image quality, comprising:
   generating a plurality of intermediate pixels positioned near a plurality of resultant pixels that are to be generated, to scale an input image by using pixels of the input image;
   determining the image characteristics of the plurality of resultant pixels using the plurality of intermediate pixels within the predetermined region,
   determining a filter for generating the plurality of resultant pixels based on the characteristics of the image with respect to the resultant pixels; and
   generating the plurality of resultant pixels through filtering of the plurality of intermediate pixels, using the determined filter.

2. The method of claim 1, wherein the generating of the plurality of intermediate pixels comprises variably determining the number, positions, and distribution of the plurality of intermediate pixels.

3. The method of claim 2, wherein the generating of the plurality of intermediate pixels comprises determining the plurality of intermediate pixels to be positioned based on positions of the plurality of resultant pixels, in sub-pixel units.

4. The method of claim 1, wherein the generating of the plurality of intermediate pixels comprises determining a filter which generates the plurality of intermediate pixels and is either applied to pixels of the predetermined region of the input image in the same manner as that applied to all pixels of the input image, or variably determining the filter for determining the plurality of intermediate pixels based on the image characteristics of the predetermined region of the input image, in order to generate the plurality of intermediate pixels.

5. The method of claim 1, wherein the generating of the plurality of intermediate pixels comprises additionally generating a plurality of intermediate pixels at new positions from among a plurality of intermediate pixels used for a next resultant pixel that is to be generated after a current resultant pixel, as compared to a plurality of intermediate pixels of a current resultant pixel.

6. The method of claim 1, wherein the determining of the filter comprises determining at least one of a direction, shape, length and coefficient of the filter based on either the image characteristics of the predetermined region of the input image or the intermediate pixels within the predetermined region.

7. The method of claim 6, wherein the determining of the filter comprises determining a filter for maintaining existence and directions of edge or detail components of either the predetermined region of the input image or the plurality of intermediate pixels within the predetermined region.

8. The method of claim 7, wherein the determining of the filter comprises determining the filter to have an asymmetrical coefficient weight for each region, wherein the asymmetrical coefficient weight is identified by the direction of an edge or detail, in order to prevent a shoot artifact from being generated, while maintaining the edge or detail components.

9. The method of claim 7, wherein the determining of the filter comprises determining the filter to have a relatively high coefficient weight according to the direction of edge or detail, in order to prevent a jagging artifact of the edge or detail components, from being generated.

10. The method of claim 1, wherein the generating of the plurality of intermediate pixels comprises using a plurality of input images.

11. An image scaling apparatus which enhances image quality, comprising:
    an intermediate pixel generation unit which generates a plurality of intermediate pixels positioned near a plurality of resultant pixels that are to be generated to scale an input image by using pixels of the input image;
    a filter determination unit which determines the image characteristics of the plurality of resultant pixels using the plurality of intermediate pixels within the predetermined region,
    wherein said filter determination unit determines a filter which generates the plurality of resultant pixels based on the image characteristics with respect to the resultant pixels, and
    a resultant pixel generation unit which generates the plurality of resultant pixels through filtering of the plurality of intermediate pixels, using the determined filter.

12. The apparatus of claim 11, wherein the intermediate pixel generation unit variably determines the number, positions, and distribution of the plurality of intermediate pixels.

13. The apparatus of claim 12, wherein the intermediate pixel generation unit determines the plurality of intermediate pixels to be positioned based on positions of the plurality of resultant pixels in sub-pixel units.

14. The apparatus of claim 12, wherein the intermediate pixel generation unit determines a filter which generates the plurality of intermediate pixels and is applied to either pixels of the predetermined region of the input image in the same manner as that applied to all pixels of the input image, or variably determines the filter which generates the plurality of intermediate pixels based on the image characteristics of the predetermined region of the input image, in order to generate the plurality of intermediate pixels.

15. The apparatus of claim 11, further comprising: a buffer memory which stores the plurality of intermediate pixels generated by the intermediate pixel generation unit,
    wherein the intermediate pixel generation unit additionally generates a plurality of intermediate pixels at new positions from among a plurality of intermediate pixels used for a next resultant pixel that is to be generated after a current resultant pixel and stores, with respect to the plurality of intermediate pixels generated for a current resultant pixel and stored in the buffer memory, the additionally generated plurality of intermediate pixels in the buffer memory.

16. The apparatus of claim 11, wherein the filter determination unit determines at least one of a direction, shape, length and coefficient of the filter based on the image characteristics of the predetermined region of the input image or the intermediate pixels within the predetermined region.

17. The apparatus of claim 16, wherein the filter determination unit determines a filter for maintaining existence and directions of an edge or detail components of the predetermined region of the input image or the plurality of intermediate pixels within the predetermined region.

18. The apparatus of claim 11, wherein the intermediate pixel generation unit uses a plurality of input images.

19. A computer readable recording medium having recorded thereon a program for executing an image scaling method which enhances image quality, wherein the program, when executed in a computer, causes the computed to perform the image scaling method of claim 1.

* * * * *